United States Patent [19]
Maier

[11] 3,797,333
[45] Mar. 19, 1974

[54] ROTARY INDEXING MECHANISM

[75] Inventor: Heinz Maier, Sulzbach, Germany

[73] Assignee: Fischer-Brodbeck GmbH Prazisionsteile-Fabrik, Weinsberg, Wurttemburg, Germany

[22] Filed: July 21, 1972

[21] Appl. No.: 274,062

[30] Foreign Application Priority Data
July 28, 1971 Germany............................. 2137698

[52] U.S. Cl. ................................. 74/826, 74/813 L
[51] Int. Cl............................................. B23b 29/32
[58] Field of Search ............... 74/826, 813 R, 813 L

[56] References Cited
UNITED STATES PATENTS

| | | | |
|---|---|---|---|
| 2,975,657 | 3/1961 | Samuel ............................. | 74/826 X |
| 3,242,771 | 3/1966 | Maier et al. ..................... | 74/826 |
| 3,386,315 | 6/1968 | Aihara et al. .................... | 74/813 R |
| 3,464,292 | 9/1969 | Parsons et al. ................... | 74/826 |
| 3,513,734 | 5/1970 | Burroughs et al. ............... | 74/826 X |
| 3,618,426 | 11/1971 | Fisher ............................. | 74/826 X |

*Primary Examiner*—Benjamin W. Wyche
*Assistant Examiner*—F. D. Shoemaker
*Attorney, Agent, or Firm*—Michael S. Striker

[57] ABSTRACT

A rotary indexing mechanism comprising a support and a turntable mounted on the support for rotation about its axis. A first crown gear is fixedly mounted on the support coaxial with the axis of the turntable and a second crown gear concentric with the first crown gear is connected with the turntable for rotation therewith. Opposite the first and the second crown gears are two concentric crown gears which are connected by flexible means for simultaneous rotation about the aforementioned axis and slithgly shiftable relative to each other in axial direction. The opposite gears can be moved in axial direction relative to the first and the second gear to bring the teeth out of engagement, permitting turning of the turntable, or to engage the teeth for locking the turntable in its turned position.

16 Claims, 1 Drawing Figure

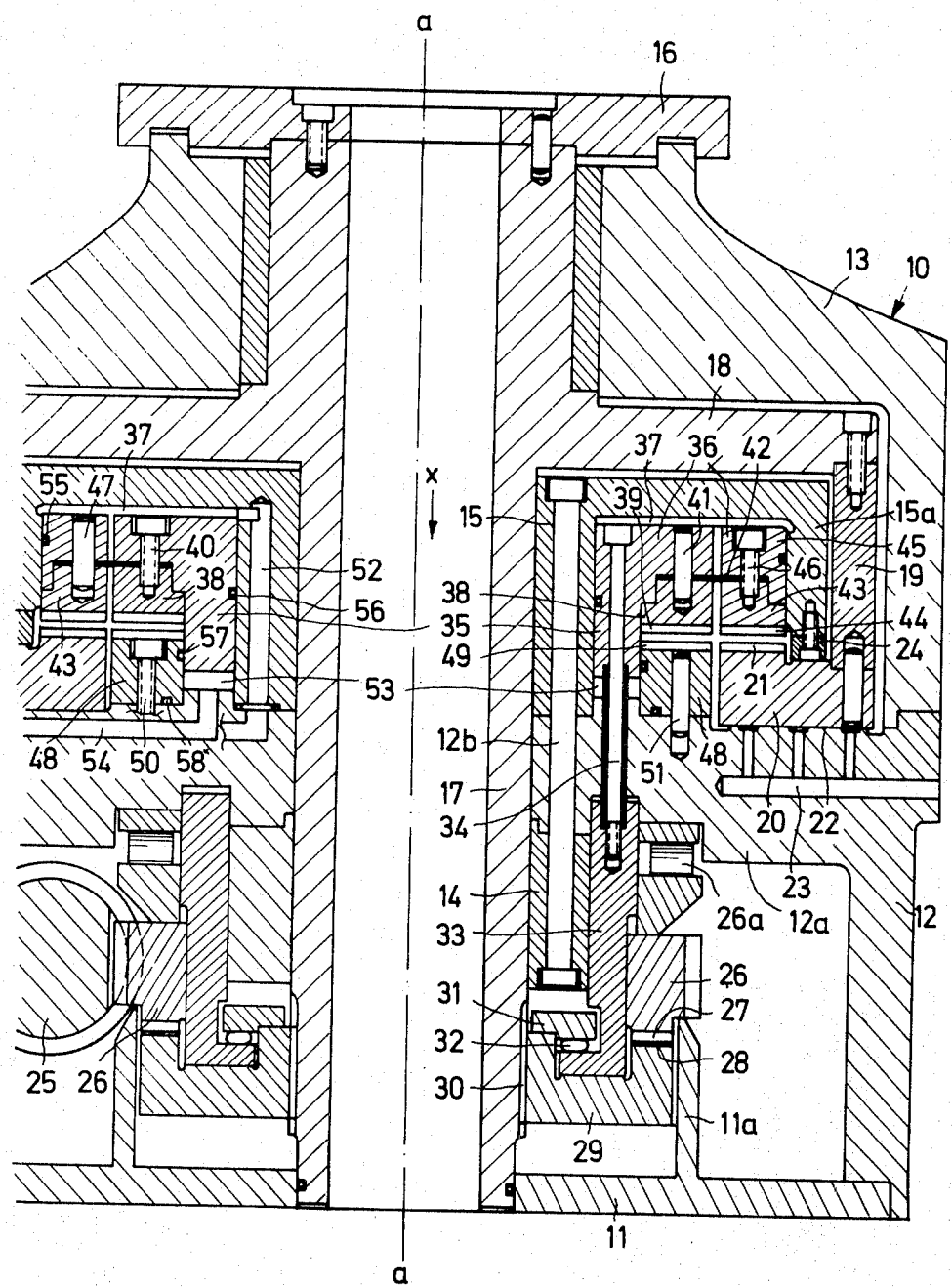

ROTARY INDEXING MECHANISM

The invention relates to a rotary indexing mechanism with crown gears e.g. to hold a rotary table in a stationary position at a selected point after it has been turned. An first crown gear is installed, as a stationary component, a second, a concentric crown gear, is connected to the rotating unit, that is to say the rotary table, while additional crown gears are installed which can move axially to and fro in such a way that they can be simultaneously meshed with the first two mentioned crown gears, to hold the rotary unit stationary.

Even with precision manufacture of the crown gears, say the manufacture of the two first mentioned crown gears in their meshed condition, the difficulty could not be avoided, that when assembling the device, the pitch circles of the two first mentioned crown gears do not align accurately in the axial plane, which for example would impair accuracy in production of the parts to be made on the device.

An important item of the invention is accordingly to achieve a configuration of the device and particularly of the gearing, independent of the accuracy of the assembly, as far as is possible.

According to an important characteristic of the invention, for this purpose the additional gear means, which are to be brought into and out of mesh with the first and second crown gears, are divided into two separate crown gears, of which each interacts with a respective one of the two first mentioned crown gears and the two separate crown gear are connected to each other flexibly in the axial direction, but are connected to one another so that they cannot rotate relative each other. By this means it can be achieved, that even with inaccuracies in assembly, and pitch circles of the axially immovable crown gears which are not accurately aligned, it is possible to satisfactorily mesh the same with the axially movable crown gears because of the relative, flexible, pliability of both the crown gears in relation to each other. This is especially applicable if the first and second crown gears, the same as the additional (third and fourth) crown gears, are jointly manufactured, that is to say with the supporting components of the gear teeth connected to each other.

In a preferred version, the two crown gears which are connected flexibly to one another (third and fourth) are flexibly and pliably connected by one or more components in the form of diaphragm elements, particularly a flexible disc. A flexible sealing disc can for example be used for this purpose, especially if the stroke operating member carrying the individual gears is designed as the piston of a piston cylinder unit.

Further features of the invention are directed to achieve a compact design and good absorption of the operating and coupling forces with minimum friction resistances, and further advantages which can be seen in the following description.

The drawing shows an axial sectional view of a rotary table with a rotary indexing mechanism as per the invention.

The stationary unit of the device includes a fixed machine-frame 10 with baseplate 11, a lower structure 12 with a carrier plate 12a which forms a dividing panel, a top structure 13, a bearing intermediate part 14 and a cylinder section 15 in which parts 14 and 15 are firmly connected to carrier plate 12a by bolts 12b. In machine frame 10 a rotary table 16 is installed with its hollow shaft 17 rotating round axis a—a. Shaft 17 has a plate shaped part 18 to which a cylindrical part 19 is bolted, which is rigidly connected to a ring-shaped crown gear 20. Parts 16, 17, 19 and 20 having axially projecting teeth 21 are combined into one rotatable unit by screws and dowel pins. For fixed axial support of the same, the crown gear 20 contacts with one end face a bearing surface 22, which is supplied with lubricating oil via a bore system 23, and on the other end face the gear 20 is supported in the axial vertical direction by a ring shaped counter bearing 24, which is bolted to the drum-shape outer wall 15a of the rigid cylinder section 15.

To actuate the rotary table in the direction of rotation an axially sliding component 25 is provided with an adjustable travel stroke (vertical to the drawing plane) which, designed as a toothed rack, stays in mesh with the spur gear 26 which is locked against axial movement at carrier plate 12a by a stop 11a at base plate 11 and an axial thrust anti-friction bearing 26a. The spur gear 26 has also axially projecting teeth 27 which can be brought into or out of mesh with corresponding axially projecting teeth 28 of an axially slidable and rotary transfer member 29 which is designed as a crown gear.

Rotary transfer member 29 is axially movably mounted on the rotary shaft 17 of the rotary table 16 by means of splines and coupled to a sleeve-shaped lift member 33 by a support plate 31 which is connected to it and an axial thrust anti-friction bearing 32, to give axial movement to member 33, while being rotatable with respect thereto. The lift member 33 is connected to member 35 by means of bolts 34 passing through the rigid carrier plate 12a of the machine frame, the member 35 being axially and movably mounted in the up and down direction as part of a ring shaped piston 36 in cylinder space 37 of cylinder section 15 of the machine frame 10, but is however prevented from rotating round axis a—a of the rotary table by bolts 34.

With the member 35, a radial inner crown gear 38, having axially projecting teeth 39, is rigidly connected by screws 40 and by a dowel pin 41. Between member 35 and crown gear 38 a flexible and pliable carrying means or intermediate element 42 is clamped at its radial inner section, which is designed as a sprung diaphragm type plate. At its radial outer section it carries a radial outer crown gear 43 with axially projecting teeth 44, which with the intermediate element 42 is rigidly clamped to the outer piston section 45 by screws 46 and a dowel pin 47, and can yield somewhat axially by means of the sprung intermediate element which acts in the form of a diaphragm with regard to the radial inner crown gear 38 or the member 35, but is however rigidly connected thereto in the direction of rotation round axis a—a.

In addition, a crown gear 48 with axially projecting teeth 49 is rigidly connected to carrier plate 12a of the stationary machine frame by bolts 50 and dowel pin 51. The lower crown gears, that is to say the stationary gear 48 and gear 20, which is connected to the rotary table 16, and is rotatable round axis a—a but cannot be moved axially, have for preference axially projecting teeth 49 and 21 with the same angular pitch, and which are manufactured as a single unit in a meshed state of both gears in accordance with the installation condition. The same accordingly applies to gears 38 and 43 whose individual teeth 39 and 44 conform to teeth 49 and 21 and are manufactured as a jointly meshed unit.

The teeth of splines 39, 44, 49 and 21 are beveled so that they have a trapezoidal cross section.

For axial actuation of piston 36, cylinder space 37 is connected to oil pressure line 52 and the axially opposite cylinder space 53 to oil pressure line 54. Seals 55, 56, 57 and 58 seal off parts moving relative to one another in the region of cylinder spaces 37 and 53.

The method of operation of the described device is as follows:

Individual teeth 39, 44 are not meshed with teeth 49 and 21 in the illustrated position of the device. By axial movement of the rack 25 the gear 26, in mesh therewith, rotary transfer member 29, rotary shaft 17, and the rotary table 16 can for example be turned with the tool clamped on to it through an angle corresponding to the set travel stroke of rack 25.

After completing this rotary movement, oil under pressure is fed via line 52 to cylinder space 37 by a suitable limit switch at the rack 25, while oil is discharged from cylinder space 53 via line 54. Piston 36 is then moved downwards with individual gears 38 and 43 in the direction of arrow x, so that individual teeth 39 and 44 mesh with teeth 49 and 21 and through this the rotary table 16 is coupled via gear 20 with stationary gear 48 and machine frame 10. Even if the gears 48 and 20 have been inaccurately assembled in such a way that teeth 49 and 21 are not situated at exactly the same height, individual gears 38 and 43 can adjust themselves relatively to each other owing to the resilient connection through the flexible, pliable intermediate element 42 and therefore ensure good meshing of teeth 39/49 with 44/21.

With the downward stroke of piston 36, by means of lift member 33, the rotary transfer member 29 is simultaneously moved in the direction of the arrow x, and the teeth 27/28 brought out of mesh. Because of this, the rack 25 can be returned to its initial position. In this initial position piston 36 with gears 38 and 43 is again raised with in the opposite direction of the arrow x, so that teeth 39/44 and 44/21 are brought out of mesh and teeth 28/27 are again brought into the meshed position, whereupon a further rotary travel stroke can be actuated.

It is not absolutely necessary that teeth 39/49 on the one side and 44/21 on the other should be of the same design, but the advantages of the invention are fully utilized as a rule only with identical design of the teeth, that is to say the same pitch angle. Also instead of an annular diaphragm as a flexible, pliable intermediate element, a number of individual diaphragm or platespring type components can be used, and sealing of cylinder spaces 37,53 may be effected differently or another suitable design may be provided, and the invention is not limited to the specific design illustrated and described.

What I claim is:

1. In a rotary indexing mechanism, a combination comprising a stationary first unit defining an axis; a second unit arranged rotatable about said axis but axially immovable with respect to said first unit; a third unit movable in the direction of said axis relative to said first and said second unit but held against rotation about said axis; means for rotating said second unit about said axis; and means for locking said second unit in any angularly adjusted position, said locking means comprising a first crown gear having axially projecting teeth and being fixedly mounted on said stationary first unit coaxial with said axis, a second crown gear having axially projecting teeth and being arranged concentric with said first crown gear and fixed to said second unit, the teeth of said first and said second gear having the same angular pitch and being respectively aligned in radial direction, a third and a fourth crown gear having axially projecting teeth of the same angular pitch as those of said first and said second crown gear, elastic connecting means connecting said third and said fourth crown gear to each other in concentric relationship elastically movable in axial direction with respect to each other and with the teeth thereof respectively aligned in radial direction, one of said third and fourth crown gears being connected to said third unit, said third and said fourth crown gear being respectively arranged opposite said first and said second gear, and means for moving said third unit and said one crown gear connected thereto as well as the gear connected by said elastic means to said one crown gear in axial direction toward and away from said first and said second crown gear for alternatingly brining the teeth of said third and said fourth crown gear in and out of engagement with those of said first and said second crown gear.

2. A combination as defined in claim 1, wherein said elastic connecting means comprise an elastic disc arranged in a plane substantially normal to said axis and means for clamping said disc at the inner peripheral region thereof to one of said third and fourth crown gears and at the outer peripheral region to the other of said two crown gears.

3. A combination as defined in claim 1, and including coupling means for connecting and disconnecting said rotating means to and from said second unit, said coupling means having an axially movable portion connected to said third unit in such a manner that when the teeth of said first and said second crown gear are brought in engagement with those of said third and fourth crown gear, said coupling means disconnects said rotating means from said second unit.

4. A combination as defined in claim 1, wherein said means for axially moving said third unit comprise a cylinder formed by said first unit and a piston axially slidable in said cylinder.

5. A combination as defined in claim 4, wherein said elastic connecting means comprise an elastic disc arranged substantially in a plane normal to said axis and wherein said third and said fourth crown gear together with the disc form part of said piston, and including means for feeding pressure fluid to opposite sides of said piston.

6. A combination as defined in claim 1, wherein said axis extends in substantially vertical direction, and wherein said first unit comprises a wall extending transverse to said axis and bearing means for mounting said second unit turnable about said axis, and wherein said means for rotating said second unit are arranged beneath said wall and said means for axially moving said third unit are substantially arranged above said wall.

7. A combination as defined in claim 1, wherein said means for rotating said second unit comprise a spur gear turnable about said axis but axially immovable with respect thereto, a rotary transfer member connected to said second unit for rotation therewith and axially movable with respect thereto, said rotary transfer member being provided with means for coupling and uncoupling said transfer member and said spur gear by axially moving the transfer member in one and the other direction along said axis, and means connecting said transfer member to said means for moving said third unit in axial direction.

8. A combination as defined in claim 7, wherein said means for coupling and uncoupling said rotary transfer member and said spur gear comprise axially projecting teeth on said transfer member and said spur gear arranged opposite each other.

9. A combination as defined in claim 7, and including rolling elements between said connecting means and said rotary transfer member.

10. A combination as defined in claim 8, and including anti-friction thrust bearing means between said spur gear and said stationary unit arranged for taking up any axial thrust imparted to said spur gear during coupling the latter with said rotary transfer member.

11. A combination as defined in claim 1, wherein said second crown gear has opposite said axially projecting teeth a face engaging a corresponding face of said stationary unit and including means for feeding a lubricant between said engaging faces.

12. In a rotary indexing mechanism, a combination comprising, a first crown gear having axially projecting teeth; a second crown gear having axially projecting teeth and being coaxially with said first crown gear and turnable about its axis relative to said first crown gear; a third crown gear having axially projecting teeth facing the teeth of said first crown gear and being arranged coaxial therewith and axially movable with respect thereto so that the teeth of said first and said third crown gear may be brought in and out of engagement with each other; a fourth crown gear having axially projecting teeth facing the teeth of said second crown gear and being arranged coaxially therewith and movable in axial direction relative thereto, so that the teeth of said fourth crown gear may be brought in and out of engagement with those of said second crown gear at least the teeth of said first and said third crown gear, on the one hand, and the teeth of said second and fourth crown gear, on the other hand, having the same angular pitch; and elastic connecting means between said third and said fourth crown gear for connecting the same for simultaneous rotation while permitting a small axial movement relative to each other.

13. A combination as defined in claim 12, wherein all of said crown gears have the same angular pitch, and wherein the teeth of said first and said second crown gear are arranged substantially in one plane normal to said axis and the teeth of said third and said fourth crown gear are arranged substantially in a plane parallel to said one plane.

14. A combination as defined in claim 12, and including means mounting said first crown gear in stationary position, means mounting said second crown gear turnable about its axis, and means for moving said third and said fourth crown gear simultaneously in axial direction.

15. A combination as defined in claim 13, and including means mounting said first crown gear in stationary position, means mounting said second crown gear turnable about its axis, and means for moving said third and fourth crown gear simultaneously in axial direction.

16. A combination as defined in claim 13, wherein said elastic connecting means comprises an elastic disc arranged substantially in a plane normal to the common axis of said gears, and means for clamping said disc at the inner peripheral region thereof to one of said third and fourth crown gears and at the outer peripheral region to the other of said two gears.

* * * * *